(12) United States Patent
Horn et al.

(10) Patent No.: US 10,884,942 B2
(45) Date of Patent: Jan. 5, 2021

(54) REDUCING MEMORY ACCESS LATENCY IN SCATTER/GATHER OPERATIONS

(71) Applicant: International Business Machines Corporation, Armonk, NY (US)

(72) Inventors: William Pettit Horn, Scarsdale, NY (US); Joefon Jann, Ossining, NY (US); Manoj Kumar, Yorktown Heights, NY (US); Jose Eduardo Moreira, Irvington, NY (US); Pratap Chandra Pattnaik, Ossining, NY (US); Mauricio J. Serrano, Bronx, NY (US); Ilie Gabriel Tanase, Somers, NY (US)

(73) Assignee: International Business Machines Corporation, Armonk, NY (US)

( * ) Notice: Subject to any disclaimer, the term of this patent is extended or adjusted under 35 U.S.C. 154(b) by 40 days.

(21) Appl. No.: 15/159,368

(22) Filed: May 19, 2016

(65) Prior Publication Data
US 2017/0336971 A1 Nov. 23, 2017

(51) Int. Cl.
*G06F 12/0897* (2016.01)
*G06F 12/0862* (2016.01)

(52) U.S. Cl.
CPC ...... *G06F 12/0897* (2013.01); *G06F 12/0862* (2013.01); *G06F 2212/1024* (2013.01); *G06F 2212/6026* (2013.01)

(58) Field of Classification Search
CPC ...... G06F 3/061; G06F 3/0644; G06F 3/0659; G06F 3/0673; G06F 2212/1024
See application file for complete search history.

(56) References Cited

U.S. PATENT DOCUMENTS

| 6,055,622 A | 4/2000 | Spillinger |
| 6,105,119 A * | 8/2000 | Kerr ................. G06F 13/4027 |
| | | 710/110 |

(Continued)

OTHER PUBLICATIONS

Inagaki, T., et al., "Stride Prefetching by Dynamically Inspecting Objects", ACM SIGPLAN Notices, Jun. 9-11, 2003, pp. 1-9.

(Continued)

*Primary Examiner* — David Yi
*Assistant Examiner* — Nicholas A. Paperno
(74) *Attorney, Agent, or Firm* — Fleit Intellectual Property Law; Thomas S. Grzesik

(57) ABSTRACT

Various embodiments execute a program with improved cache efficiency. In one embodiment, a first subset of operations of a program is performed on a plurality of objects stored in one or more data structures. The first subset of operations has a regular memory access pattern. After each operation in the first subset of operations has been performed, results of the operation are stored in one of the plurality of queues. Each queue in the plurality of queues is associated with a different cacheable region of a memory. A second subset of operations in the program is performed utilizing at least one queue in the plurality of queues. The second subset of operations utilizes results of the operations in the first subset of operations stored in the queue. The second subset of operations has an irregular memory access pattern that is regularized by localizing memory locations accessed by the second subset of operations to the cacheable region of memory associated with the at least one queue. Results of each operation performed in the second subset of operations are stored in memory.

20 Claims, 11 Drawing Sheets

(56) References Cited

U.S. PATENT DOCUMENTS

| | | | |
|---|---|---|---|
| 7,769,974 | B2 | 8/2010 | Bhansali et al. |
| 8,250,093 | B2 | 8/2012 | Van der Linden |
| 2004/0123041 | A1 | 6/2004 | Krishnaiyer et al. |
| 2007/0186036 | A1* | 8/2007 | Bittner, Jr. ............. G11C 15/00 711/108 |
| 2007/0294682 | A1* | 12/2007 | Demetriou ................ G06F 8/45 717/153 |
| 2008/0043750 | A1* | 2/2008 | Keels .................. H04L 49/9094 370/395.52 |
| 2012/0167069 | A1* | 6/2012 | Lin ........................ G06F 8/456 717/160 |

OTHER PUBLICATIONS

Shuf, Y., et al., "Creating and Preserving Locality of Java Applications at Allocation and Garbage Collection Times", 17th Annual ACM Conference on Object-Oriented Programming, Systems, Languages, and Applications, Nov. 4-8, 2002, pp. 1-13.

Siegwart, D., et al., "Improving Locality with Parallel Hierarchical Copying GC", Proceedings of the 5th International Symposium on Memory Management, ACM, Jun. 10-11, 2006, pp. 1-12.

Veldema, R., et al., "Object Combining: A new aggressive optimization for Object Intensive Programs", Proceedings of the 2002 joint ACM-ISCOPE conference on Java Grande, Nov. 3-5, 2005, pp. 1-10.

Zhou, J. et al., "Memory Management for Many-Core Processors with Software Configurable Locality Policies", Proceedings of the International Symposium on Memory Management, Jun. 15-16, 2012, pp. 1-12.

Buono, D., et al., "Optimizing Sparse Matrix-Vector Multiplication for Large-Scale Data Analytics", International Conference on Supercomputing, Jun. 1-3, 2016, pp. 1-12.

Ekanadham, K., et al., "Graph Programming Interface: Rationale and Specification", IBM Research Report RC25508, Nov. 19, 2014, pp. 1-33.

University of Tennesee, "Basic Linear Algebra Subprograms Technical (BLAST) Forum Standard", Basic Linear Algebra Subprograms Technical (BLAST) Forum, Aug. 21, 2001, pp. 1-315.

Brandes, U., "A Faster Algorithm for Betweenness Centrality", Journal of Mathematical Sociology, 2001, pp. 1-15, vol. 25, No. 2.

Bader, D., et al., "The Graph BLAS effort and its implications for Exascale", SIAM Workshop on Exascale Applied Mathematics Challenges and Opportunities, Jul. 6-7, 2014, pp. 1-3.

Seo, S., et al., "Design and Implementation of Software-Managed Caches for Multicores with Local Memory", 15th International Conference on High-Performance Computer Architecture, Feb. 14-18, 2009, pp. 1-12.

Sura, Z., et al., "Using Multiple Threads to Accelerate Single Thread Performance", Proceedings of the 2014 IEEE 28th International Parallel & Distributed Processing Symposium, May 19-23, 2014, pp. 1-10.

Buono, D., et al., "Optimizing Sparse Linear Algebra for Large-Scale Graph Analytics", Computer, Aug. 2015, pp. 1-9.

OpenMP, "OpenMP Application Program Interface", Version 4.0, Jul. 2013, pp. 1-320.

\* cited by examiner

```
01    for (i = 0; i < number_of_rows ; i++) {
02      for (j = numEdges[i] ; j < numEdges[i+1] ; j++ ) {
03        output_vec[endV[j]] += input_vec[i] * weight[j] ;
04      }
05    }
```

```
01  for (i = 0; i < number_of_rows; i++) {
02      for (j = numEdges[i]; j < numEdges[i+1] ; j++ ) {
03      // output vec[endV[j]] += input vec [i] * weight[j] ;
04          k = endV[j] >> logRSS ;  // obtain the bin address.
05          bin = bin_array[k]; // obtain the bin information
06          pointer = bin->current; // current entry in bucket
07          pointer->index = endV[j];
08          pointer->value = input_vec[i] * weight[j];
09          bin->current = pointer + 1;
10          if (pointer == bin->limit) { /* Flush Bin */
11             for (p=bin->start; p < bin->limit; p++)
12                output_vec[p->index += p->value ;
13             bin->current = bin->start;
14          }
15      }
16  }
17  for (k = 0; k <NUM_BINS ; k++ ) { /* Flush All Bins */
18      bin = bin_array[k];
19      for (p = bin->current; p < bin->limit; p++ )
20         output_vec [p->index] += p->value ;
21      bin->current = bin->start ;
22  }
```

FIG. 8

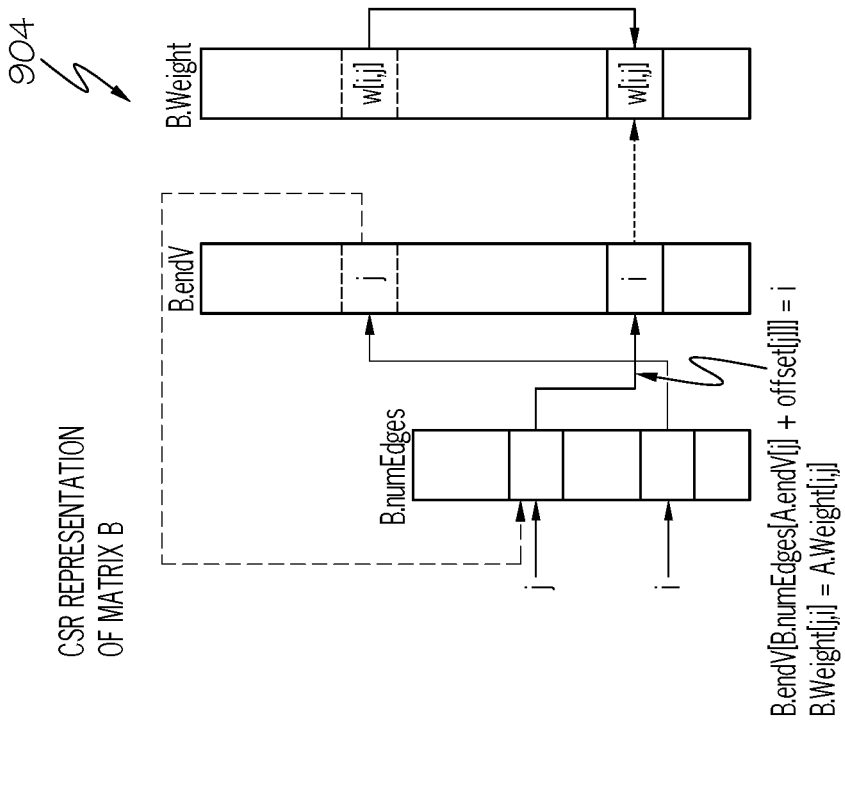
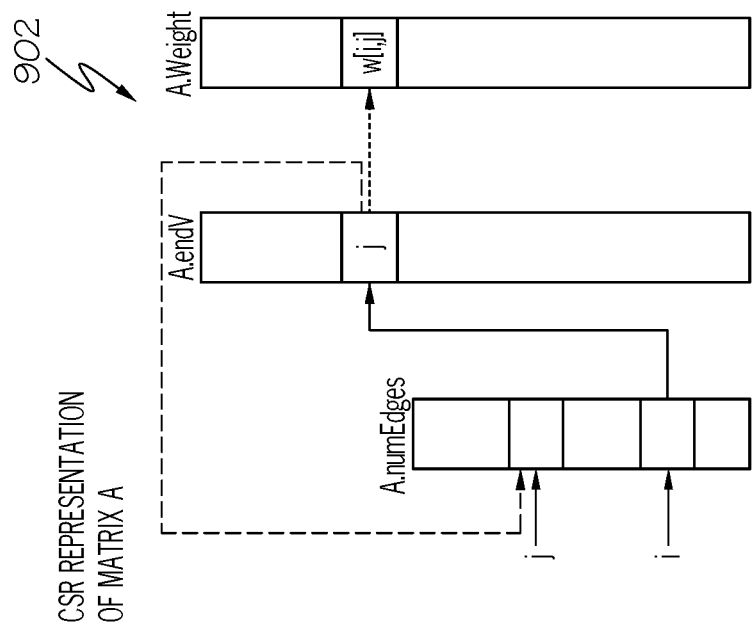
FIG. 9

```
01      for (i = 0; i < A.number_of_rows ; i++) {
02          for (j = A.numberEdges[i]; j < A.numedges[i+1] ; j++ ) {
03  //----------- The following code
04  //           B.endV [B.numEdges[A.endV[j]] + offset [j]] = i
05  //----------- expanded below
06              k1 = A.endV[j] >> logRSS ;
07              bucket1 = bucket_array1[k1];
08              ptr1 = bucket1->current;
09              ptr1->i     = i;
10              ptr1->endV  = A.endV[j];
11              ptr1->offset = offset[j];
12              bucket1->current++;
13              if (bucket1->current == bucket1->limit) { /*Flush Bucket */
14                  for (p1=bucket1->start; p1 < bucket1->limit; p1++ ) {
15                      basePlusOff = B.numEdges [p1->endV] + p1->offset;
16                      k2 = basePlusOff >> logETSS ;
17                      bucket2 = bucket_array2[k2];
18                      ptr2 = bucket2->current;
19                      ptr2->i     = p->i;
20                      ptr2->base  = basePlusOff;
21                      bucket2->current++;
22                      if (bucket2->current== bucket2->limit) { /*Flush Bucket */
23                          for (p2=bucket2->start; p2< bucket2->limit; p2++)
24                              B.endV [bucket2->base] = bucket2->i;
25                          bucket2->current = bucket2->start;
26                      }
27                  }
28                  bucket1->current = bucket1->start;
29              }
30          }
31      }
```

FIG. 10

```
01   // Dumping the bucket
02   global_lock = bucket->lock;
03   number_of_entries = bucket->current - bucket->start;
04   granularity = 64;
05   number_of_chunks = (number_of_entries + granularity+1)/granularity
06   for (c = 0; c < number_of_chunks; c++) {
07       initial = c * granularity;
08       last   = initial + granularity;
09       if (last > number_of_entries) last = number_of_entries;
10       LOCK (global_lock)
11       for (p = bucket->start+initial; p < (bucket->start+last); p++)
12           output_vec[p->index] += p->value;
13       UNLOCK (global_lock)
14   }
15   bucket->current = bucket->start;
```

FIG. 11

```
01  dump_bucket (bucket) {
02      global_lock = bucket->lock;
03      number_of_entries = bucket->current - bucket->start;
04      granularity = 64;
05      number_of_chunks = (number_of_entries + granularity+1)/granularity
06      for (c = 0; c < number_of_chunks; c++) {
07          start = c * granularity;
08          end  = start + granularity;
09          if (end > number_of_entries) end = number_of_entries;
10          while(1) {
11              LOCK(Global_lock)
12              if (lock does not succeeds)
13                  dump_bucket (bucket->next;
14              Else break;
15          }
16          for (p = bucket->start+start; p < (bucket->start+end); p++)
17              output_vec[p->index] += p->value;
18          UNLOCK (Global_lock)
19      }
20      bucket->current = bucket->start;
21  }
```

FIG. 12

REDUCING MEMORY ACCESS LATENCY IN SCATTER/GATHER OPERATIONS

BACKGROUND

The present disclosure generally relates to data processing within computing environments, and more particularly relates to reducing memory access latency in scatter/gather operations.

Unstructured data such as large scale graph data is generally problematic for conventional caching and prefetching mechanism. The connectivity of large scale graphs is highly irregular, i.e., accesses to large subsets of graph nodes or edges induce memory access patterns with very poor spatial or temporal locality in memory addresses. These memory access patterns generally cannot be performed efficiently in modern processor architectures. The consequence of these irregular accesses to memory is excessive cache misses and address translation misses that result in poor performance of the computing system.

BRIEF SUMMARY

In one embodiment, a method for executing a program with improved cache efficiency data is disclosed. The method comprises performing a first subset of operations of a program on a plurality of objects stored in one or more data structures. The first subset of operations has a regular memory access pattern. After each operation in the first subset of operations has been performed, results of the operation are stored in one of the plurality of queues. Each queue in the plurality of queues is associated with a different cacheable region of a memory. A second subset of operations in the program is performed utilizing at least one queue in the plurality of queues. The second subset of operations utilizes results of the operations in the first subset of operations stored in the queue. The second subset of operations has an irregular memory access pattern that is regularized by localizing memory locations accessed by the second subset of operations to the cacheable region of memory associated with the at least one queue. Results of each operation performed in the second subset of operations are stored in memory.

In another embodiment, an information processing system for executing a program with improved cache efficiency data is disclosed. The information processing system comprises memory and a processor that is operably coupled to the memory. The processor is configured to perform a method. The method comprises performing a first subset of operations of a program on a plurality of objects stored in one or more data structures. The first subset of operations has a regular memory access pattern. After each operation in the first subset of operations has been performed, results of the operation are stored in one of the plurality of queues. Each queue in the plurality of queues is associated with a different cacheable region of a memory. A second subset of operations in the program is performed utilizing at least one queue in the plurality of queues. The second subset of operations utilizes results of the operations in the first subset of operations stored in the queue. The second subset of operations has an irregular memory access pattern that is regularized by localizing memory locations accessed by the second subset of operations to the cacheable region of memory associated with the at least one queue. Results of each operation performed in the second subset of operations are stored in memory.

In yet another embodiment, a computer program product for executing a program with improved cache efficiency data is disclosed. The computer program product comprises a storage medium readable by a processing circuit and storing instructions for execution by the processing circuit for performing a method. The method comprises performing a first subset of operations of a program on a plurality of objects stored in one or more data structures. The first subset of operations has a regular memory access pattern. After each operation in the first subset of operations has been performed, results of the operation are stored in one of the plurality of queues. Each queue in the plurality of queues is associated with a different cacheable region of a memory. A second subset of operations in the program is performed utilizing at least one queue in the plurality of queues. The second subset of operations utilizes results of the operations in the first subset of operations stored in the queue. The second subset of operations has an irregular memory access pattern that is regularized by localizing memory locations accessed by the second subset of operations to the cacheable region of memory associated with the at least one queue. Results of each operation performed in the second subset of operations are stored in memory.

In yet another embodiment, a method of performing identical operations independently on a collection of objects is disclosed. The objects have a natural sequential order and the operations on the objects in that natural order access some of the data arrays with a common indirection vector. The method comprises restructuring the computation into two parts, the first part comprising of all regular accesses and partial computations that can be competed with those regular accesses, and the second part comprising of the indirection vector based accesses and the remaining computations that can be completed with these indirect accesses and the results of the first part of computation. Queues are provided to hold the results of first part, and a hashing algorithm to select one of such queues for a given object. The first part of the computation is performed for all nodes in the natural order and queuing the results of the computation for the second part in the aforementioned queue selected by the hashing algorithm. The second part of the computation is performed for all entries in the queue when the queue becomes full, or when the first part of the computation for all nodes has been completed In a further embodiment, a method of performing identical operations independently on a collection of objects is disclosed. The objects have a natural sequential order and the operations on the objects in that natural order access some of the data arrays with a common double or multiple indirection vectors. The method comprises restructuring the computation into multiple parts, the first part comprising of all regular accesses and partial computations that can be competed with those regular accesses, and the subsequent parts comprising of the next level indirection vector based accesses and the remaining computations that can be completed with these indirect accesses and the results of their prior part's computation. Queues are provided to hold the results of each prior part, and a hashing algorithm to select one of such queues for a given object. The hashing algorithm can be different for all each part, or shared between the partitions. The first part of the computation is performed for all nodes in the natural order and queuing the results of the computation for the subsequent parts in the aforementioned first stage queue selected by the hashing algorithm. The subsequent parts of the computation are performed, one at a time, for all entries in the queue when the queue becomes full, or when the first part of the computation for all nodes has been completed.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which:

FIG. 8 shows the source code fragment of FIG. 6 after it has been transformed efficient memory access according to one embodiment of the present disclosure;

FIG. 9 illustrates double indirection for a matrix transpose operation according to one embodiment of the present disclosure;

FIG. 10 shows one example of a source code fragment for an optimized matrix transpose kernel according to one embodiment of the present disclosure;

FIG. 11 shows a multi-threaded version of the source code fragment of FIG. 8 according to one embodiment of the present disclosure;

FIG. 12 shows a version of the multi-threaded source code fragment of FIG. 11 optimized to handle lock contention according to one embodiment of the present disclosure.

DETAILED DESCRIPTION

Operating Environment

Figure 1:
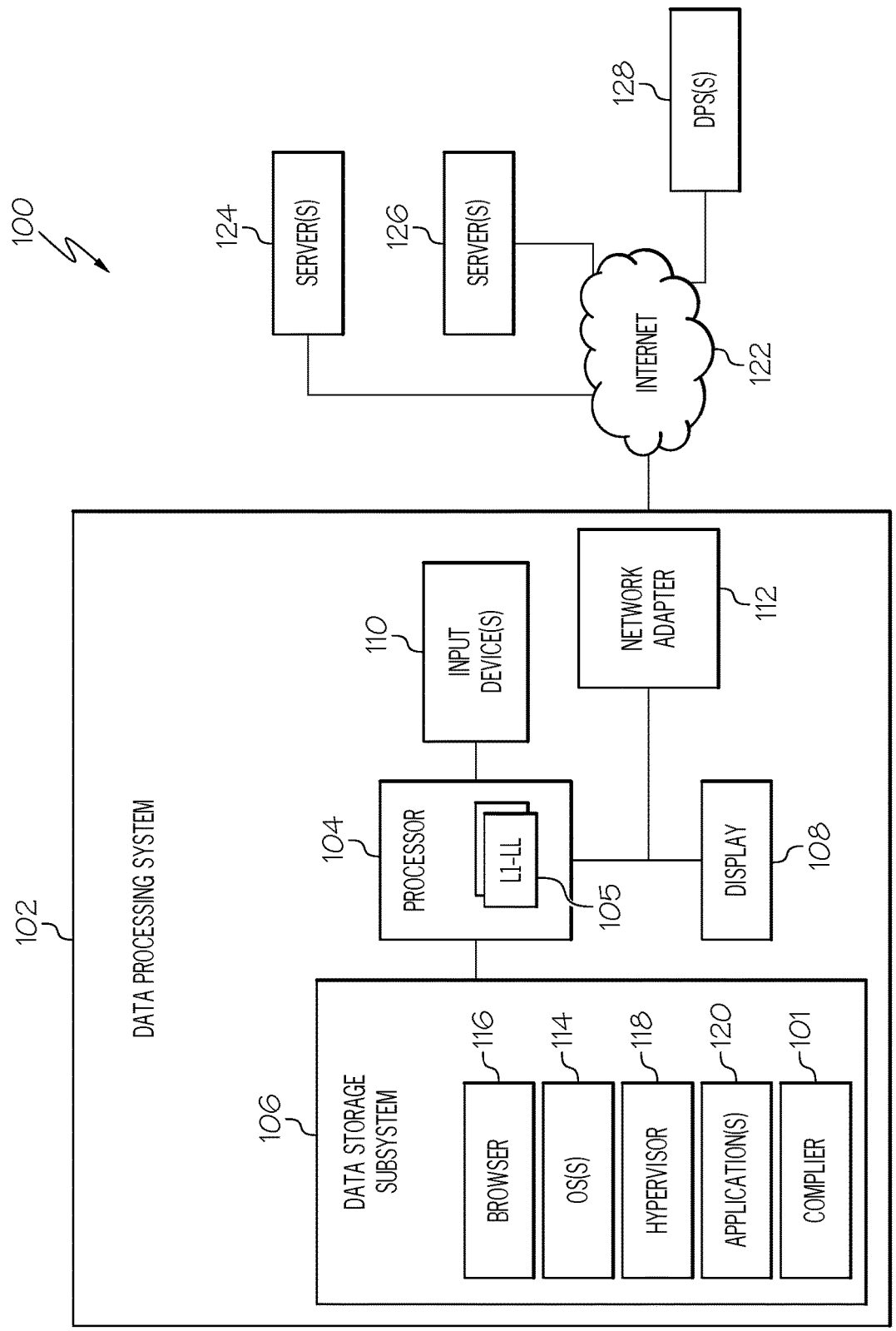
FIG. 1 is a block diagram illustrating one example of an operating environment according to one embodiment of the present disclosure.

With reference to FIG. 1, one example of data processing environment 100 is illustrated that includes a data processing system 102 that is configured, according to one or more embodiments of the present disclosure, to localize memory accesses through program transformation and execute the program with improved cache efficiency. For example, programs such as user applications can be partitioned by, for example, a compiler 101 of the data processing system, so that latency of memory access operations in each partition can be minimized more effectively by reordering the operations of that partition independent of the order of operations in other partitions. It should be noted that embodiments of the present disclosure are not limited to a compiler 101 partitioning the user program at compile time, as the source code of the program can be partitioned prior to the program being compiled. In another embodiment, the processor 104 can be programmed to performing the partitioning.

The data processing system 102 may take various forms, such as workstations, laptop computer systems, notebook computer systems, desktop computer systems or servers and/or clusters thereof. The data processing system 102 includes one or more processors 104 (which may be chip multiprocessors (CMPs) that include one or more processor cores for executing program code, with each processor core having an associated hierarchy of caches L1-LL 105) coupled to a data storage subsystem 106, optionally a display 108, one or more input devices 110, and a network adapter 112. The data storage subsystem 106 may include, for example, application appropriate amounts of various memories (e.g., dynamic random access memory (DRAM), static RAM (SRAM), and read-only memory (ROM)), and/or one or more mass storage devices, such as magnetic or optical disk drives. For example, data storage subsystem 106 may include L2 and L3 cache and main memory.

The data storage subsystem 106 includes one or more operating systems (OSs) 114 for the data processing system 102. The data storage subsystem 106 also includes application programs, such as a browser 116 (which may optionally include customized plug-ins to support various client applications), a hypervisor (or virtual machine monitor (VMM)) 118 for managing one or more virtual machines (VMs) as instantiated by different OS images, and other applications (e.g., a word processing application, a presentation application, and an email application) 120.

The display 108 may be, for example, a cathode ray tube (CRT) or a liquid crystal display (LCD). The input device(s) 108 of the data processing system 102 may include, for example, a mouse, a keyboard, haptic devices, and/or a touch screen. The network adapter 112 supports communication of the data processing system 102 with one or more wired and/or wireless networks utilizing one or more communication protocols, such as 802.x, HTTP, simple mail transfer protocol (SMTP), etc. The data processing system 112 is shown coupled via one or more wired or wireless networks, such as the Internet 122, to various file servers 124 and various web page servers 126 that provide information of interest to the user of the data processing system 102. The data processing environment 100 also includes one or more data processing systems 128 that are configured in a similar manner as the data processing system 102. In general, the data processing systems 128 represent data processing systems that are remote to the data processing system 102 and that may execute OS images that may be linked to one or more OS images executing on the data processing system 102.

Those of ordinary skill in the art will appreciate that the hardware components and basic configuration depicted in FIG. 1 may vary. The illustrative components within the data processing system 102 are not intended to be exhaustive, but rather are representative to highlight components that may be utilized to implement the present invention. For example, other devices/components may be used in addition to or in place of the hardware depicted. The depicted example is not meant to imply architectural or other limitations with respect to the presently described embodiments.

Overview

As noted above, the data processing system 102 comprises various levels of cache memory. Cache memory is utilized by a processor to reduce the latency of memory operations. Allocation of space in caches is handled by the processor(s). Data is transferred from main memory to cache in blocks of fixed size referred to as cache lines. The number of cache lines that the cache can hold is limited by the size of the cache. When a cache line is copied from memory into the cache a cache entry is created, which comprises the copied data and the requested memory location referred to as a tag.

Caches generally operate according to data locality, which dictates that once data is accessed it will usually be accessed soon again. Data locality can be divided into various types of locality such as temporal and spatial. Temporal locality indicates that the program reuses data that it recently used and, therefore, the data is likely to be in cache. There is a temporal proximity between adjacent data references to the same memory location. Spatial locality indicates that the program is likely to utilize data in memory locations close to recently accessed memory locations. Since the processor loads a chunk of memory around an accessed location into the cache, data from memory locations close to recently accessed location are also likely to be in the cache.

When the processor needs to read from or write to a location in the main memory the processor first checks the cache for a corresponding entry. For example, given a memory address of the operation, the cache lines are checked to determine if any of the lines comprise the data at that the memory location. A determination is made, using a set index, as to which cache set (a "row" in the cache) the address should reside in. Then, for each cache line in the identified cache set, the tag associated with the line is compared to the tag from the address. If a match is found the valid bit is checked to determine if the data is in the cache. If the data is found in one of the cache lines, a cache hit occurs. However, if a program accesses a memory location that is not found in a cache line a cache miss occurs, and the processor stalls while it waits for the requested data to be fetched from the next level of cache or from the main memory. A new cache entry is then created in the cache for the fetched data. However, if all the cache lines in the cache are in use when the processor creates the new entry, one of the current lines is evicted to allow room for the new cache line.

Cache misses directly influence the performance of an application. Therefore, prefetching is utilized to help avoid cache misses. Prefetching is an operation performed by the processor in which data blocks are requested from the main memory and stored in cache prior the data being needed. There are various types of prefetching such as software and hardware prefetching. Software prefetching involves the compiler or programmer inserting prefetch instructions into the program. Hardware prefetching involves the processor monitoring memory access patterns of the program to predict the data that the program will access next. The processor then obtains this data from the main memory and stores it in the cache.

One type of data that can be problematic for efficient memory access and caching is unstructured data, i.e., data that does not have a pre-defined data model or that is not organized in a pre-defined manner. Unstructured data can be intuitively represented as graphs, whose vertices can be labeled with user names or events, and edges with the relationships between them. These graphs can include large amounts of data approaching the Terabyte range. Analytics of these large scale-free graphs plays an important role in many different fields such as social network analytics, homeland security, financial fraud prevention, targeted marketing, etc.

However, the connectivity of these graphs is highly irregular, which results in accesses to large subsets of graph nodes or edges inducing memory access patterns with very poor spatial or temporal locality in memory addresses. Furthermore, any reasonable window of memory accesses analyzable in hardware has very poor predictability for future accesses. These memory access patterns generally cannot be performed efficiently in modern processor architectures. The consequence of these irregular memory access patterns in large graph analytics is that caches or data prefetch mechanisms of modern processor architectures are ineffective in masking the access latency to memory and result in poor performance of the computing system. Another challenge when executing these access patterns in parallel is the synchronization cost. Multiple updates to consolidate partial results produced by different threads in multi-threaded environments require synchronization. Each update is typically very small, thus the cost of acquiring/releasing a lock is typically much larger than the cost of the actual update.

Modern many-core processors can execute few instructions per cycle per core. It takes many cycles (at least a few hundred cycles) to get data from main memory, the memory beyond the last level cache and off-chip. Furthermore, in a typical application it takes only a few instructions to traverse an edge of a graph and update few fields in a node at one end of it, before moving on to process another edge/node. The number of instructions executed per edge traversed in BFS (Breadth First Search), a typical graph algorithm kernel, varies between 12 and 20 instructions depending on the version of the compiler and data structure used to represent the graph. Thus, unless the data touched in processing a node (and/or the data adjacent to it in the same cache line) is reused from the cache repeatedly, the processor will stall for most its cycles as it waits for data from main memory to arrive at the cache.

Figure 2:
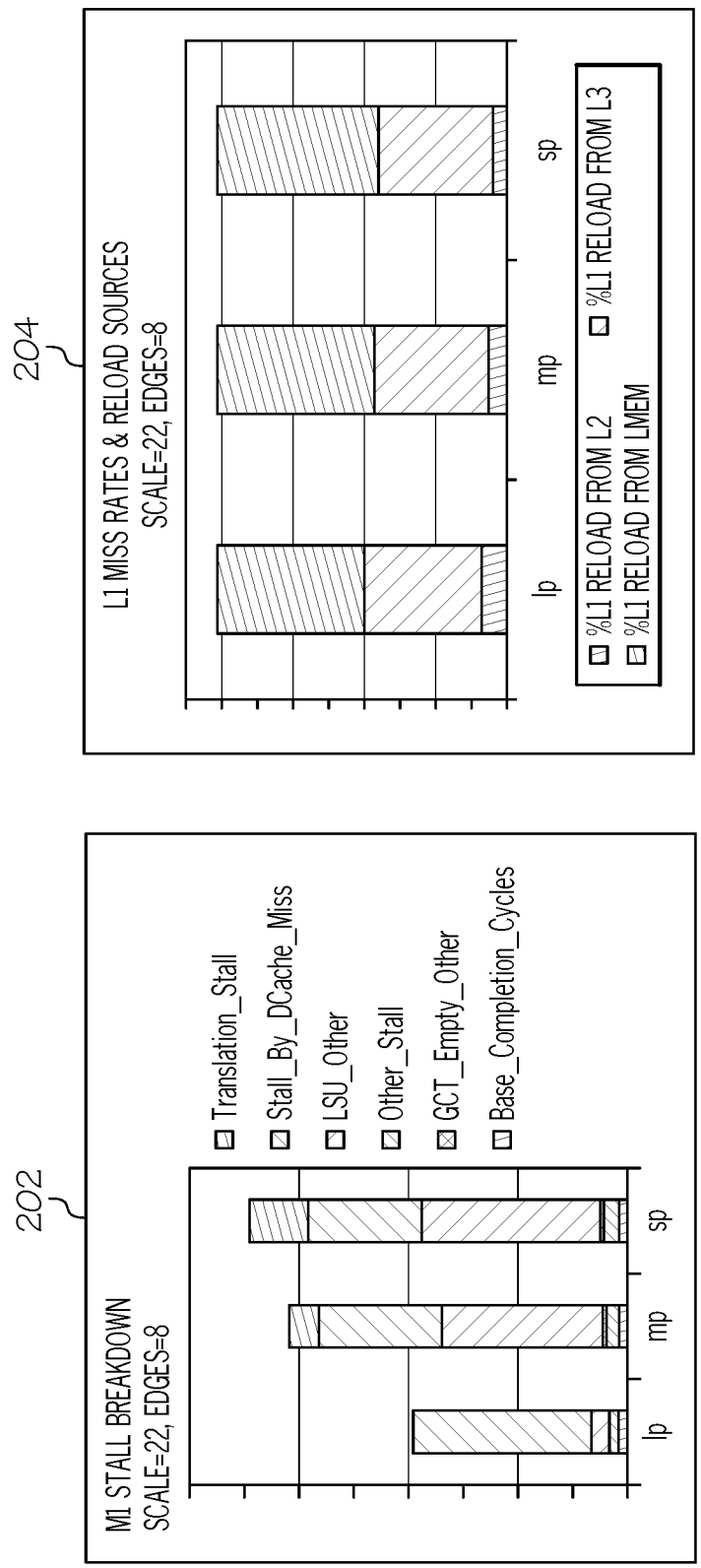
FIG. 2 is a graphical representation of memory access latency associated with processing sparse graph data.

FIG. 2 quantifies the above problem for the betweenness centrality algorithm by Brandies, which is shortest path counting of unweighted edges based on BFS, followed by a reversal traversal of the discovered shortest paths to update the centrality measure. The measurements are for single core, single threaded execution. The x-axis in both graphs is the page size, 1p=16m, mp=64K and sp=4K. In Graph A 202, 'LSU other' category is primarily missed in the TLB cache entries, a problem mitigated by using large pages. The y-axis of Graph A is CPI (cycles per instruction). The sp bar indicates that even with use of large pages for most of the cycles the processor is idle as the next instruction to complete awaits input data to appear in cache. The graph analyzed is an rMat graph of 4 million nodes and on average eight edges per node. Graph B 204 illustrates that most of the level 1 cache misses are being satisfied from main memory. The problem becomes worse as the graph size increases. The height of the bars in Graph B is 1.

One or more embodiments overcome the problems discussed above by transforming applications with irregular memory accesses such as large graph analytics applications to improve the operation of the processor executing the applications. For example, the applications are transformed so that memory access latency for unstructured data such as graph-oriented data is minimized. As will be discussed in detail below, an application is transformed by partitioning the application into multiple partitions and reordering the operations in each partition independently. Embodiments, improve cache efficacy by improving localization of access in memory (spatial locality). This is achieved, in one embodiment, by data (addresses/indices) dependent reordering of the accesses in the application kernel. The localization of accesses also alleviates bandwidth constraints that can arise in extremely high load-store/compute ratio kernels.

In one embodiment, the applications to be transformed comprise one or more characteristics such as they proceed in phases (fronts or waves), where each phase is computation on a subset of nodes that can be performed in parallel. Breadth first search is one such example, where nodes at the same distance from the root of the search tree constitute a phase. Another characteristic is that nodes can be processed in any order within a phase. The results computed within a phase are not consumed in the same phase.

Once the application is transformed and executed by the processor(s) 104, the processor 104 takes as part of its input unstructured data such as a graph. In one embodiment, a graph is stored and represented within the memory of a computing system as an adjacency matrix, albeit highly sparse for large graph analytics applications. Most graph algorithms can be expressed succinctly in a linear algebra framework involving these matrices. The matrix-vector or vector-vector operations in the linear algebra framework constitute the aforementioned phases in a natural way. By changing the order in which the nodes are processed in a phase, irregular accesses of the application are localized to memory regions of cacheable size, thereby mitigating the poor cache performance illustrated in FIG. 2.

Embodiments of the present disclosure are discussed with respect to two kernels, sparse matrix-vector multiply and matrix transpose. However, other kernels are applicable as well. The former is a computation performed by the processor to determine the reachability of new nodes from a given set of nodes. The latter used to implement some operations more efficiently. With respect to analytics applications, the performance of an un-optimized kernel measured as cycles per instruction (CPI), can be several tens of times slower than that on well-behaved scientific engineering applications. Therefore, these applications benefit from the embodiments of the present disclosure. The graph analytics library is one example of a library that can take advantage of the transformations performed by one or more embodiments.

Various embodiments take advantage of the fact that most graph-based applications processes nodes of the graph in several phases, with each phases processing a new subset of unprocessed nodes reachable from already processed nodes. Furthermore, the order in which the subset nodes of the graph are processed intra-phase does not affect the results of the computation. Embodiments take advantage of this flexibility in intra-phase ordering of the computations on the nodes to improve reuse of data in the cache. This is accomplished, in one embodiment, by adapting the principles of lazy evaluation. For example, the transformation of an application program a processor to initialize and maintain a collection of fixed capacity bins/queues to defer irregular access. Each bin captures accesses to a limited region of memory that can be included in cache. The processor partitions application memory space across these bins.

Localizing Program Memory Access

Figure 3:
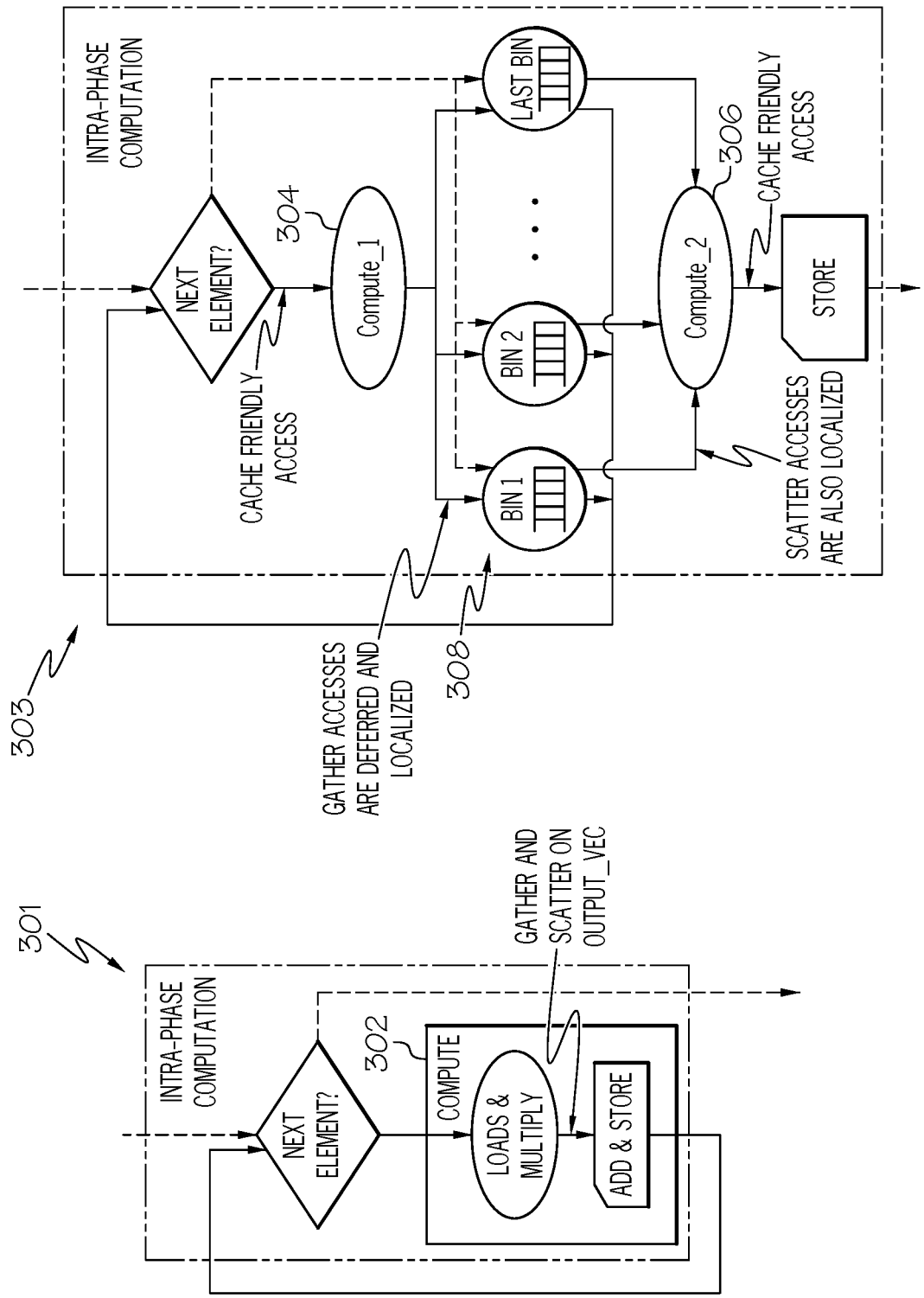
FIG. 3 is a graphical illustration transforming application kernels to improve cache efficacy according to one embodiment of the present disclosure.

FIG. 3 illustrates a general principle for transforming application kernels to improve cache efficacy according to one or more embodiments. The left hand side 301 of FIG. 3 illustrates an un-optimized way of performing an intra-phase computation in a graph analytics kernel. An example application would be BFS or equivalently vector matrix multiply discussed above. A phase in the computation corresponds to a processor identifying all nodes at distance d+1 from the root, given all nodes of lesser distance. All non-zero elements of the input vector or nodes in the current frontier of the graph are iterated over by the processor and multiplied with each non-zero element of the corresponding matrix row. The result is added to the output vector at a location indexed by the column of the matrix element. With respect to graphs, the matrix is adjacency matrix of the graph and the output vector is the next frontier.

The computational kernel can be reduced to a directed acyclic graph (DAG) in which all inner loops have been reduced to a single node, leaving one outer loop (this computation DAG should not be confused with the application graph). This reduced DAG or R_DAG, labeled as 'Compute', can be partitioned into two non-overlapping parts, a Compute_1 partition 304 and Compute_2 partition 306, as illustrated on the right side 303 of FIG. 3. The first partition 304, labeled Compute_1, comprises load/store operations that predominantly have a common access pattern to arrays. The second partition 306, labeled Compute_2, includes loads/stores that predominantly have a different common access pattern to arrays. Both partitions also include non-load/store operations dependent on the data accessed in the respective part. Each part can have load/store operations with access patterns different from its dominant common pattern. In some embodiments, these additional access patterns either exhibit good cache behavior, or are an insignificant part of the total computation for the node.

The R_DAG nodes in Compute_1 partition 304 can be assumed to have regular accesses; otherwise the order of processing graph nodes in the Compute_1 partition 304 can be changed to make the accesses mostly regular, i.e., access patterns where the addresses of the consecutive elements of an array being accessed are consecutive numbers or sequences predictable in hardware with small gap between successive accesses, where the small gap is relative to cache line size. Consequently, computations of the Compute_2 partition 306 will become mostly irregular. Irregular accesses arise from indirect accesses where the consecutive accesses to elements of a data structure have no regular pattern and may be at arbitrary distance from each other. Accordingly, the Compute_1 partition 304 comprises of all regular accesses and the partial evaluation of the DAG that can be performed with these regular accesses. The Compute_2 partition 306 comprises 1.) accesses that were originally irregular, but have been partially regularized by binning; 2.) results of accesses that were originally on regular stride and partial computation results on those accesses performed in Compute_1 partition 304, but now are stored along with queue entries to avoid irregular access to them in Compute_2 partition 306; and 3.) Calculations based on above accesses that could not be completed on Compute_1 partition 304 are now performed in Compute_2 partition 306.

It should be noted that if there are more than two often used different access patterns, an uncommon case, then Compute phase 302 in FIG. 3 can be partitioned to multiple sequentially executable partitions, one partition for each access pattern. Furthermore, multiple sets of queues are kept, one at each partition boundary. This is not a limitation as the queues are accessed sequentially, and thus even a large number of them will have only their active cache line cached.

In between the two compute partitions 304, 306 are the bins 308 to manage lazy completion of the Compute_2 partition 306, triggered by the bin being full or the completion of a phase. The completion of a phase is indicated in FIG. 3 by the dashed arrows from 'next-element' to all the bins, indicating control to flush the bins (perform stores on all existing entries) upon termination of the loop. By batching Compute_2 calculations by bins, and thus reordering them, the originally irregular accesses of the Compute_2 partition 306 are localized to cacheable memory regions.

Figure 5:
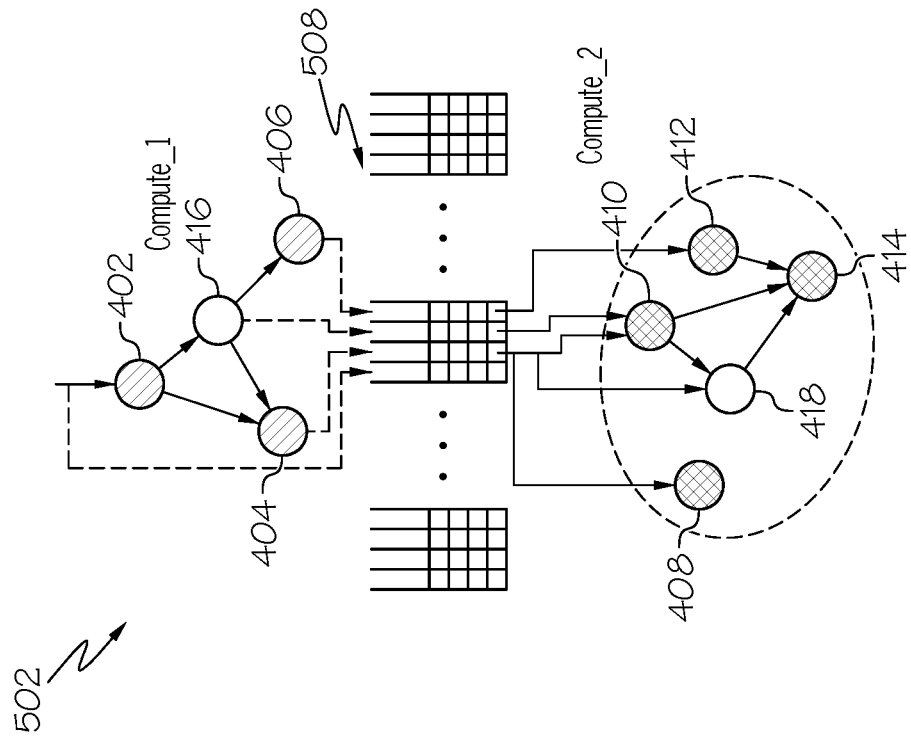
FIG. 5 shows a directed acyclic graph of the computation kernel after being transformed according to one embodiment of the present disclosure.
Figure 4:
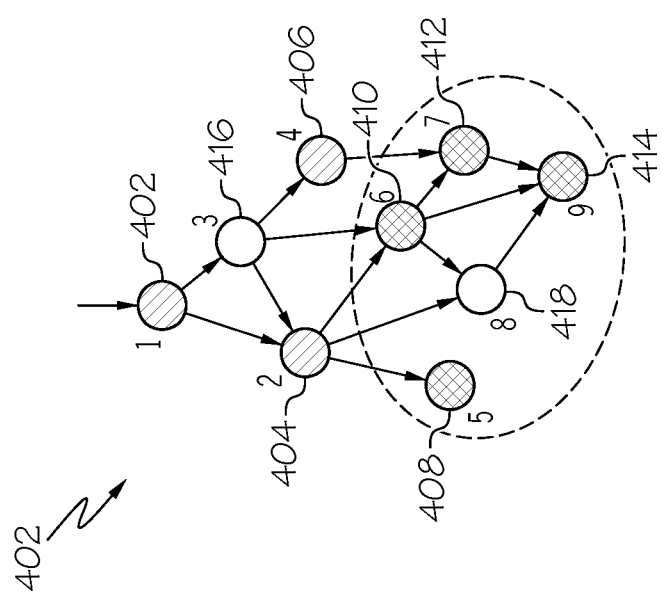
FIG. 4 shows a directed acyclic graph of a computational kernel before being transformed according to one embodiment of the present disclosure.

All partial results of Compute_1 partition 304, needed by the Compute_2 partition 306, are stored along with queue entries as illustrated in FIGS. 4 and 5. For example, FIG. 4 shows the R_DAG 402 for the un-optimized Compute phase 302 of FIG. 3, and FIG. 5 shows the R_DAG 502 for the optimized Compute_1 and Compute_2 partitions 304, 306 of FIG. 3. In each of these figures the patterned nodes 402 to 414 correspond to load or store operations, while the unfilled nodes 416, 418 are arithmetic/logic operations. The nodes 402, 404, 406, with diagonal lines indicate that load/store data is known to have good cache locality of prefecthable access pattern (stride), while nodes 408, 410, 412, 414 with a crosshatched pattern indicate load/store data with irregular access patterns that either do not have good cache locality or cannot effectively be prefetched by either software/hardware. FIG. 5 shows that the (partial) results of the computations of the Compute_1 partition 304 are stored within bins 508 along with the queue entries. FIG. 5 further shows that that computations of performed during the Compute_2 partition 306 utilize the data stored within a corresponding bin and their memory accesses are therefore localized to the given region of memory associated with the bin.

Figures 6, 7:
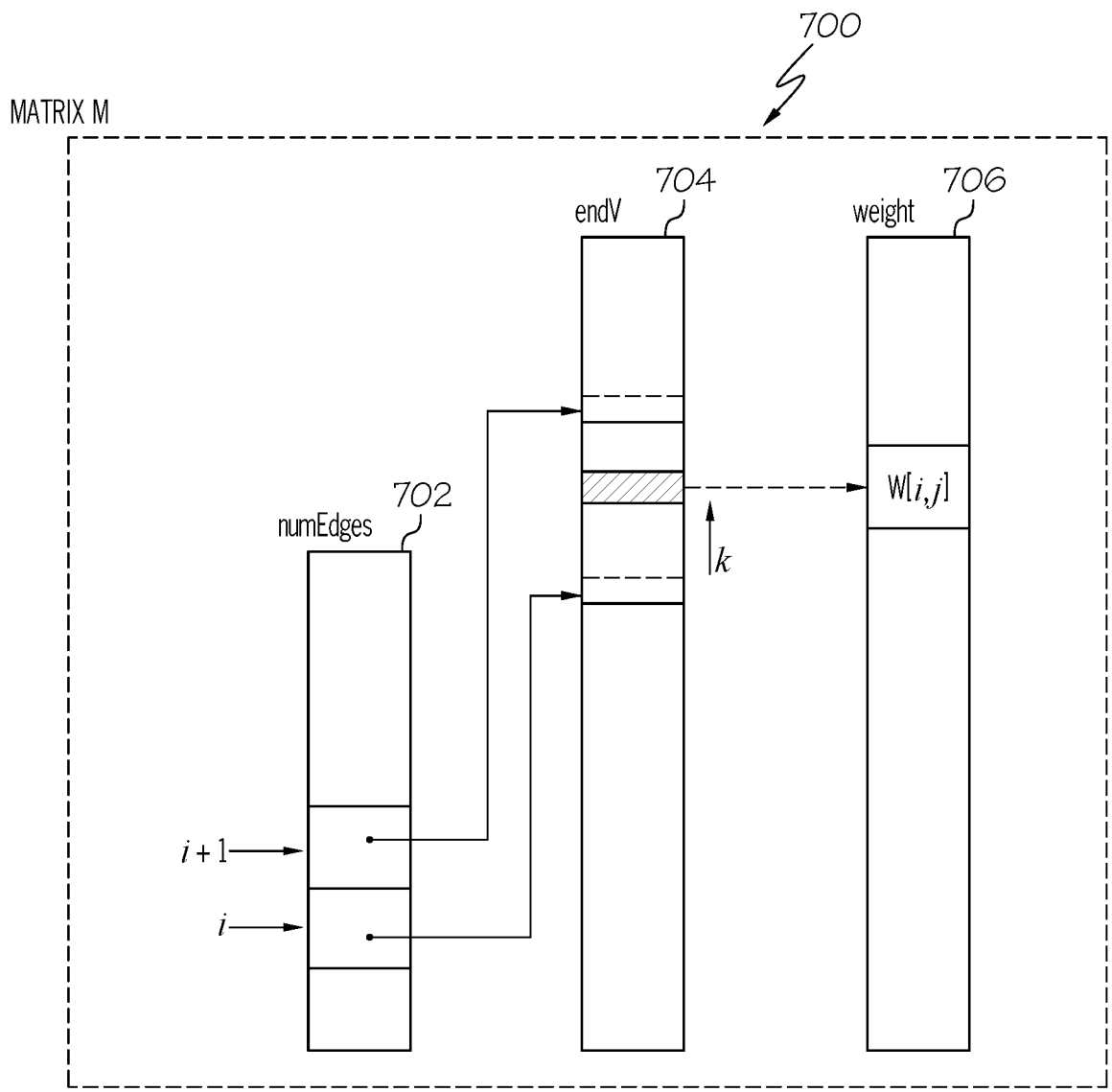
FIG. 6 shows one example of a source code fragment for an un-optimized sparse matrix-vector multiply kernel according to one embodiment of the present disclosure.
FIG. 7 shows one example of a Compressed Row Storage representation of a matrix being operated on by the program of FIG. 6 according to one embodiment of the present disclosure.

FIGS. 6-8 show one example of how an actual program can be transformed according to the above principles. As noted, one type kernel application to embodiments of the present disclosure is a sparse matrix-vector multiply kernel. FIG. 6 shows code 600 for multiplying an input_vec with a matrix sparse matrix M to produce an output vector output_vec. The matrix M has number_of_rows rows and is assumed to be in CSR (Compressed Row Storage) format. FIG. 7 shows an illustrated example of a CSR format 700 for matrix M. The CSR format 700 uses three arrays: numEdges 702, endV 704, and weight 706. The array numEdges 702 is an array of size equal to the number of rows of the matrix plus 1, and it comprises offsets into arrays endV 704 and weight 706. The array endV 404 is the index of non-zero column entries for each row and the array weight 706 is the actual non-zero entries.

Returning to FIG. 6, there is one program statement, line 03, within the double nested for-loop. The accesses to the input vector and the three arrays of the matrix are regular. Stated differently, the addresses of the consecutive elements of each array being accesses are consecutive numbers or arithmetic sequences with small a gap between successive accesses, where the small gap is relative to cache line size. Therefore, many processor architectures can deliver good streaming performance in accessing those arrays. However, the access patterns for the output_vec are irregular since a gather operation is required for read followed by a scatter for write-back. Stated differently, the consecutive elements of the output_vec data structure have no regular pattern and may be an arbitrary distance from each other. This results in caches data prefetch mechanisms of modern computing systems becoming ineffective.

Therefore, one or more embodiments transform the program shown in FIG. 6 by partitioning the application into multiple partitions and reordering the operations in each partition independently. For example, the program is transformed to initialize and maintain a collection of fixed capacity bins/queues (each being an array of tuples) to defer irregular access. Each bin captures accesses to a limited region of memory that can be included in cache. The application memory space is partitioned across these bins.

The application is transformed such that when the processor 104 performs an intra-phase computation the most irregular access pattern is identified and the per node computation is partitioned into a first part that has regular accesses and calculations dependent on them, and a second part that has irregular accesses and the computations dependent on them. When processing a node of a graph during computations of a phase, the processor 104 first completes computation of the first part for each node. The processor 104 defers computation of the second part to a future time by queuing the results of the first part computations into a bin. Each bin represents a cacheable region of memory, which is the size of one of the processor cache levels. In one embodiment, the bin fits in the closest cache (L1 or L2) for reduced access latency, but in general, should not exceed the size of the processor last level cache. The processor 104 accomplishes this, for example, by hashing the address modulo of the number of queues maintained. When a bin becomes full the processor 104 processes all of its entries, i.e., the deferred accesses and the computation(s) that depend on them. When all intra-phase candidate nodes have been examined, the processor 104 processes the remaining queued up entries for all queues. When queuing a node for later evaluation, array data or indices used to access the array data needed to complete the processing for that node are included in the queue entry.

For example, FIG. 8 shows code 800 for the program of FIG. 6 after being transformed according to one or more embodiments. The transformed code 800 shown in FIG. 8 eliminates the memory access latency for scatter/gather on the output vector. In particular, lines 4-22 of the program are an expansion of line 03 in FIG. 6. The code in statements 04-06 programs the processor 104 to compute a bin and the location in the bin where the partial result, i.e., the product term of statement 08 and the index of statement 07, are stored for use later to complete the computations of the node. In one embodiment, the bin number is computed by picking up high order bits of the index into output_vec. This is equivalent to division by an integer power of two, implying that bin sizes are an integer power of two. It should be noted that the bins are initialize prior to starting computation on the transformed kernel, where storage is allocated for the queues and a pointer to the queues is initialized.

A bin includes the following pointers: start, the first entry in the bin, limit, the maximum entry in the bin, and current, the current entry in the bin. Each entry in the bin includes the pair {index,value}. In statement 06, the processor 104 obtains the pointer to the current entry. In statements 07-08, the processor 104 inserts the information {index,value} is into that entry. In statement 09, the processor 104 increments the current pointer by one. In statement 10, the processor 104 performs a check to determine if the bin has become full, and if so, in lines 11-13, the processor 104 completes the remaining part of the per node computation for the entries in the bin. For example, the processor 104 performs a batch of stores into the output vector localized to a cacheable region of memory. The bin is then reinitialized to its empty state. Finally, in lines 17-22 the processor 104 completes a batch of store into the output vector localized to a cacheable region of memory for all bins that include partial information at completion of the phase.

With respect to double indirection, as found with matrix transpose operation, the above procedure can be applied in a nested manner. In particular, some operations such as matrix transposition require double indirection as shown in FIG. 9. For every edge <I,endV[j]> in matrix A 902, an edge <endV[numEdges[endV[j]]+offset[j]],i > has to be added to matrix B 904. The general principle for handling double or multiple indirections, say n-way indirection, is to partition the per node computation DAG into three or more generally n+1 parts. These partitions can be labeled as $P_0, P_1, \ldots, P_n$. $P_0$ computations are performed by the processor 104 first and they access sequential or localized data. Computations for $P_i$, i>0, are performed by the processor 104 after the $i_{th}$ indirection. After computation in each partition $P_i$, i<n, accesses for the next stage indirections and partial results needed for the computations in the next and future stage partitions are queued in new stage of queues. Thus, there are as many stages of queues as the levels of indirection, which is one less than the number of partitions.

Example code 1000 for programming the processor 104 to handle double or multiple indirections this is shown FIG. 10. The first indirection is for endV[j] in line 04. Instead of making this access, the processor 104 queues the access in a first stage of buckets. When the processor 104 performs the endV[j] access in a localized region of memory (with better cache hits) in the loop beginning in line 14 the processor 104 obtains the second indirection for numEdges in line 19. The processor 104 once again queues this access up to localize the access to the numEdges array. The code to flush the queues upon termination of the double for loop is not shown.

Embodiments of the present disclosure can also be extended to multi-threaded programming models by providing each thread its independent copy of the single threaded programming model queues and restricting accesses to a region of memory by only one thread by maintaining a lock for each region of memory. In a multi-threaded environment, the processor 104 assigns each thread its private copy of buckets (or queues) to store the information generated by that thread and to be passed from one phase of the computation to the next. Synchronization is not required while updating the buckets with results of the Compute_1 partition. However, when the bucket becomes full the process of flushing each bucket to perform the Compute_2 partition operations, including accesses to memory requires synchronization, since multiple threads working on its replica of the same bucket, covering identical region of memory, may write to the same memory location simultaneously. For the un-optimized example shown in FIG. 6, updating the output vector in statement 03 requires locking the element position. Since the amount of work performed in that update is very small, synchronization overhead may actually be much higher than the cost of the update.

FIG. 11 shows one example of code 1100 for a multi-threaded implementation of the operations represented in FIG. 8. In this example, each thread has been given its own private copy of b buckets labeled $B_0, B_1, \ldots, B_{b-1}$. Correspondingly there is a vector of B Locks labeled $L_0, L_1, \ldots, L_{b-1}$. The lock $L_i$, 0<=i<b, guards access to the memory from buckets $B_i$ of all threads. In statement 02, the program obtains a pointer into the lock $L_i$ protecting updates from the bucket $B_i$. In statement 03, the number of entries stored in the bucket is computed. In statement 04, the update granularity is defined; the granularity is 64 updates per bucket. In statement 05, the number of update chunks is computed from the number of entries and the granularity. Statement 06 loops over the number of update chunks. Statements 07-09 compute the start and end indices of the bucket entries to dump. The global lock is acquired in statement 10, protecting updates to the output vector in the range defined by the bucket. Statements 11-12 update the output vector, and finally statement 13 releases the lock.

Lock contention can be reduced by reducing the size of the buckets, since the larger number of locks to protect the larger number of smaller buckets will reduce the contention for locks. Another technique useful in case of contention is that if a thread fails to grab a lock for a bucket, then it could search for more buckets that it could dump while the current bucket is being locked by another thread. This reduces the idle-time of the thread, which otherwise would have to wait until the lock is released. FIG. 12 shows an improved example of how to handle lock contention for the second case. The code 1200 is shown as a recursive subroutine call. The example is similar to the previous example shown in FIG. 11, except for the addition of lines 25-30. Line 26 attempts to grab the global lock. If lock does not succeed (because it is grabbed by another thread), then an attempt is performed to dump another bucket owned by the thread, using a recursive call. The field next contains a pointer to the next bucket in the list of buckets owned by a thread.

Operational Flow Diagram

Figure 13:
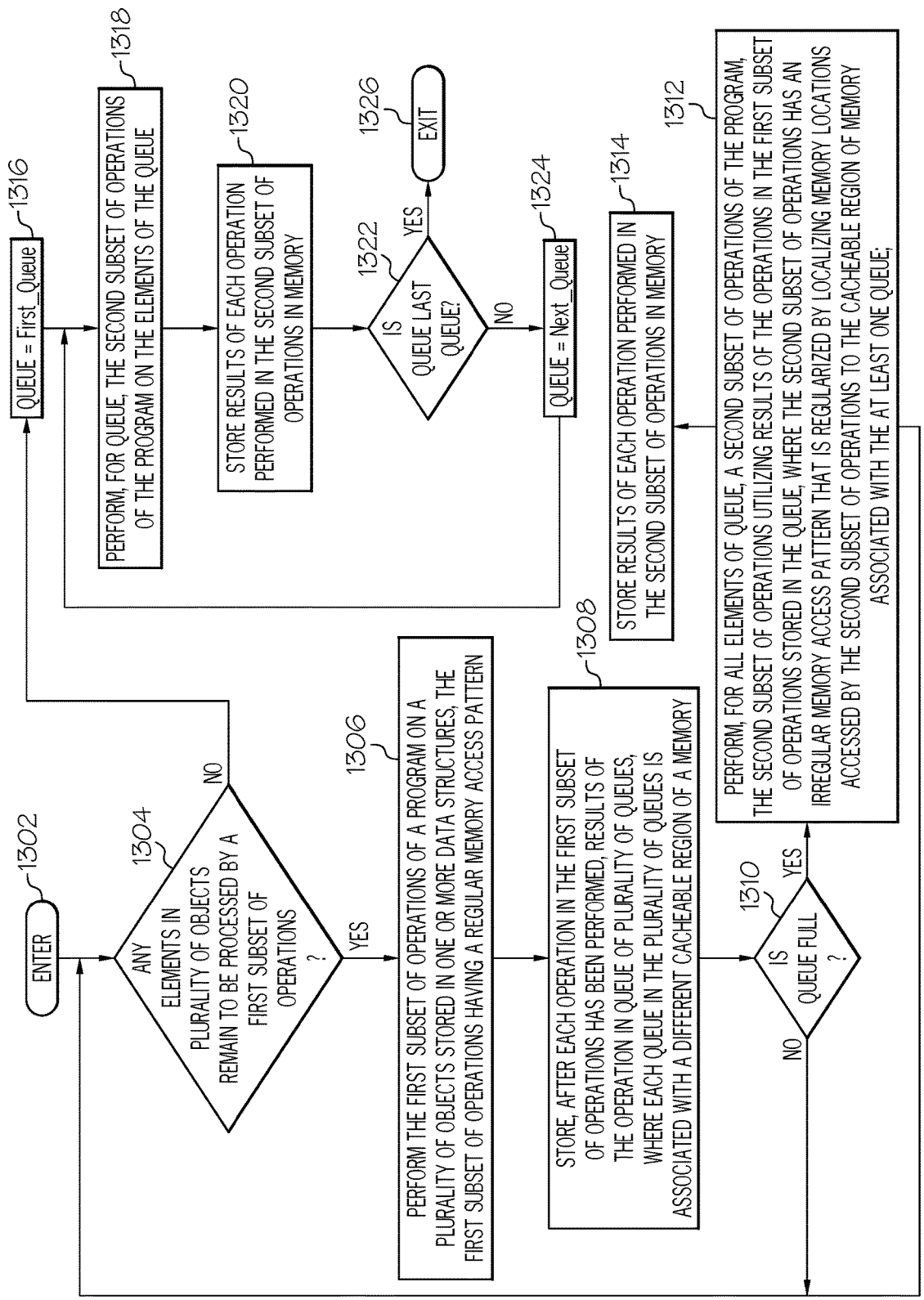
FIG. 13 is an operational flow diagram illustrating one process for executing a program with improved cache efficiency.

FIG. 13 is an operational flow illustrating one example of a process for executing a program with improved cache efficiency. The operational flow diagram of FIG. 13 begins at step 1302 and flows directly to step 1304. The processor 104, at step 1304, determines if any elements in a plurality of objects remain to be processed by a first set of operations for a program. If the result of this determination is positive, the processor 104 performs the first subset of operations of a program on a plurality of objects stored in one or more data structures at step 1306. The first subset of operations has a regular memory access pattern. The processor 104, at step 1308 stores, after each operation in the first subset of operations has been performed, results of the operation in one of the plurality of queues, where each queue in the plurality of queues is associated with a different cacheable region of a memory.

The processor 104, at step 1310, determines if the current queue is full. If the result of this determination is negative, the control flow returns to step 1304. If the result of this determination is positive, the processor 104 performs, for elements of the full queue, a second subset of operations of the program at step 1312. The second subset of operations utilizes results of the operations in the first subset of operations stored in the queue. The second subset of operations has an irregular memory access pattern that is regularized by localizing memory locations accessed by the second subset of operations to the cacheable region of memory associated with the at least one queue. The processor 104, at step 1314, stores results of each operation performed in the second subset of operations in memory. For example, the results are stored in an output vector. The control flow returns to step 1304.

Referring back to step 1304, if the result of the determination made at this step is negative, the processor 104 sets the queue to the first queue in the plurality of queues at step 1316. The processor 104, at step 1318, performs the second subset of operations of the program on the elements of the queue. The processor 104, at step 1320, stores results of each operation performed in the second subset of operations in memory. For example, the results are stored in an output vector. The processor 104, at step 1322, determines if the current queue was the last queue. If the result of this determination is negative, the control flow returns to step 1318. If the result of this determination is positive, the control flow exits for the current intra-phase computation at step 1326.

Non-Limiting Embodiments

As will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit", "module", or "system."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer maybe connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A method, by at least one information processing system, for executing a program with improved cache efficiency, the method comprising:
    receiving a program for processing a plurality of objects stored in one or more data structures;
    prior to executing the program,
        partitioning the program comprising a plurality of operations into a first partition and at least a second partition, wherein the first partition is configured to comprise a first subset of operations from the plurality of operations having regular access patterns and further configured to comprise a first set of computations that utilize the regular access patterns, wherein the second partition is configured to comprise at least a second subset of operations from the plurality of operations initially having irregular access patterns prior to the partitioning that is subsequently regularized by configuring each of the irregular access patterns to access one of a set of limited regions of memory represented by a plurality of queues, and wherein the second partition is further configured to comprise a second set of computations that utilize the irregular access patterns and results from the first set of computations of the first partition,
        reordering an original programmed execution sequence of operations from the first subset of operations independent of the second subset of operations,
        reordering an original programmed execution sequence of operations from the second subset of operations independent of the first subset of operations,
        transforming the program by adding code that configures the program to maintain the plurality of queues, where each queue in the plurality of queues is associated with a different cacheable region of a memory, wherein when the program is received the program is absent code configuring the program to maintain the plurality of queues when executed; and
    executing the program, wherein executing the program comprises
        performing a first set of one or more operations from the first subset of operations on the plurality of objects stored in the one or more data structures, the first set of one or more operations having a regular memory access pattern,
        storing, after each operation of the first set of one or more operations from the first subset of operations has been performed, results of the operation in one of the plurality of queues,
        performing, for at least one queue in the plurality of queues, a second set of one or more operations of the second subset of operations, the second set of one or more operations utilizing results of the operations of the first set of one or more operations stored in the queue as input, where irregular access patterns of the second set of one or more operations are regularized by localizing memory locations accessed by the second set of one or more operations to the cacheable region of memory associated with the at least one queue, and
        storing results of each operation performed in the second set of one or more operations in memory.

2. The method of claim 1, wherein the result of performing the at least one operation in the first set of one or more operations is stored in the queue based on a memory location accessed by the at least one operation and the cacheable region of memory associated with the queue.

3. The method of claim 1, wherein performing the second set of one or more of operations is in response to:
    determining that the at least one queue is full.

4. The method of claim 1, wherein performing the second set of one or more operations is in response to:
    determining that all objects in the plurality of objects have been processed by the first set of one or more operations.

5. The method of claim 1, wherein the memory is a shared memory and operations in the first set of one or more operations and operations in the second set of one or more operations are performed by multiple threads, and wherein the method further comprises:
    maintaining the plurality of queues for each of the multiple threads;
    maintaining a plurality of locks, wherein each lock in the plurality of locks is associated with a different queue that is common across the plurality of queues being maintained for each of the multiple threads; and
    locking the cacheable region of memory associated with a queue in the plurality of queues prior to one of the multiple threads performing an operation in the second set of one or more operations that accesses the cacheable region of memory.

6. The method of claim 1, wherein storing each operation performed in the second subset of operations comprises:
    storing, after each operation in the second set of one or more operations has been performed, the results of the operation from the second set of one or more operations in one of the plurality of queues based on the memory location accessed by the operation and the cacheable region of memory associated with the queue.

7. The method of claim 6, further comprising:
    performing, for at least one queue in the plurality of queues comprising results of operations in the second set of one or more operations, a third subset of the plurality of operations from a third partition of the program, the third subset of operations utilizing results of the operations in the second set of one or more operations stored in the queue as input.

8. An information processing system for executing a program with improved cache efficiency:
   a memory; and
   a processor communicatively coupled to the memory, the processor configured to perform a method comprising:
      receiving a program for processing a plurality of objects stored in one or more data structures;
      prior to and executing the program,
         partitioning the program comprising a plurality of operations into a first partition and at least a second partition, wherein the first partition is configured to comprise a first subset of operations from the plurality of operations having regular access patterns and further configured to comprise a first set of computations that utilize the regular access patterns, wherein the second partition is configured to comprise at least a second subset of operations from the plurality of operations initially having irregular access patterns prior to the partitioning that is subsequently regularized by configuring each of the irregular access patterns to access one of a set of limited regions of memory represented by a plurality of queues, and wherein the second partition is further configured to comprise a second set of computations that utilize the irregular access patterns and results from the first set computations of the first partition,
         reordering an original programmed execution sequence of operations from the first subset of operations independent of the second subset of operations,
         reordering an original programmed execution sequence of operations from the second subset of operations independent of the first subset of operations,
         transforming the program by adding code that configures the program to maintain a plurality of queues, where each queue in the plurality of queues is associated with a different cacheable region of a memory, wherein when the program is received the program is absent code configuring the program to maintain the plurality of queues when executed; and
      executing the program, wherein executing the program comprises
         performing a first set of one or more operations from the first subset operations on the plurality of objects stored in the one or more data structures, the first set of one or more operations having a regular memory access pattern,
         storing, after each operation of the first set of one or more operations from the first subset of operations has been performed, results of the operation in one of the plurality of queues,
         performing, for at least one queue in the plurality of queues, a second set of one or more operations of the second subset of operations, the second set of one or more operations utilizing results of the operations of the first set of one or more operations stored in the queue as input, where irregular access patterns of the second set of one or more operations are regularized by localizing memory locations accessed by the second set of one or more operations to the cacheable region of memory associated with the at least one queue, and
         storing results of each operation performed in the second set of one or more operations in memory.

9. The information processing system of claim 8, wherein the result of performing the at least one operation in the first set of one or more operations is stored in the queue based on a memory location accessed by the at least one operation and the cacheable region of memory associated with the queue.

10. The information processing system of claim 8, wherein performing the second set of one or more operations is in response to at least one of:
   determining that the at least one queue is full; and
   determining that all objects in the plurality of objects have been processed by the first subset of operations.

11. The information processing system of claim 8, wherein the memory is a shared memory and operations in the first set of one or more operations and operations in the second set of one or more operations are performed by multiple threads, and wherein the method further comprises:
   maintaining the plurality of queues for each of the multiple threads;
   maintaining a plurality of locks, wherein each lock in the plurality of locks is associated with a different queue that is common across the plurality of queues being maintained for each of the multiple threads; and
   locking the cacheable region of memory associated with a queue in the plurality of queues prior to one of the multiple threads performing an operation in the second set of one or more operations that accesses the cacheable region of memory.

12. The information processing system of claim 8, wherein storing each operation performed in the second subset of operations comprises:
   storing, after each operation in the second set of one or more operations has been performed, the results of the operation from the second set of one or more operations in one of the plurality of queues based on the memory location accessed by the operation and the cacheable region of memory associated with the queue.

13. The information processing system of claim 12, wherein the method further comprises:
   performing, for at least one queue in the plurality of queues comprising results of operations in the second set of one or more operations, a third subset of the plurality of operations from a third partition of the program, the third subset of operations utilizing results of the operations in the second set of one or more operations stored in the queue as input.

14. A computer program product for executing a program with improved cache efficiency, the computer program product comprising a storage medium readable by a processing circuit and storing instructions for execution by the processing circuit for performing a method, the method comprising:
   receiving a program for processing a plurality of objects stored in one or more data structures;
   prior to executing the program,
      partitioning the program comprising a plurality of operations into a first partition and at least a second partition, wherein the first partition is configured to comprise a first subset-of operations from the plurality of operations having regular access patterns and further configured to comprise a first set of computations that utilize the regular access patterns, wherein the second partition is configured to comprise at least a second subset of operations from the plurality of operations initially having irregular access patterns prior to the partitioning that are subsequently regularized by configuring each of the irregular access patterns to access one of a set of limited regions of memory represented by a plurality of queues, and wherein the second partition is further configured to comprise a second set of computations that utilize the irregular access patterns and results from the first set of computations of the first partition, reordering an original programmed execution sequence of operations from the first subset of operations independent of the second subset of operations, reordering an original programmed execution sequence of operations from the second subset of operations independent of the first subset of operations, transforming the program by adding code that configures the program to maintain a plurality of queues, where each queue in the plurality of queues is associated with a different cacheable region of a memory, wherein when the program is received the program is absent code configuring the program to maintain the plurality of queues when executed; and executing the program, wherein executing the program comprises performing a first set of one or more operations from the first subset of operations on the plurality of objects stored in the one or more data structures, the first set of one or more operations having a regular memory access pattern, storing, after each operation of the first set of one or more operations from the first subset of operations has been performed, results of the operation in one of the plurality of queues, performing for at least one queue in the plurality of queues, a second set of one or more operations of the second subset of operations, the second set of one or more operations utilizing results of the operations of the first set of one or more operations stored in the queue as input, where irregular access patterns of the second set of one or more operations are regularized by localizing memory locations accessed by the second set of one or more operations to the cacheable region of memory associated with the at least one queue, and storing results of each operation performed in the second set of one or more operations in memory.

15. The computer program product of claim 14, wherein the result of performing the at least one operation in the first set of one or more operations is stored in the queue based on a memory location accessed by the at least one operation and the cacheable region of memory associated with the queue.

16. The computer program product of claim 14, wherein performing the second set of one or more of operations is in response to:

determining that the at least one queue is full.

17. The computer program product of claim 14, wherein performing the second set of one or more operations is in response to:

determining that all objects in the plurality of objects have been processed by the first set of one or more operations.

18. The computer program product of claim 14, wherein the memory is a shared memory and operations in the first set of one or more operations and operations in the second set of one or more operations are performed by multiple threads, and wherein the method further comprises:

maintaining the plurality of queues for each of the multiple threads;

maintaining a plurality of locks, wherein each lock in the plurality of locks is associated with a different queue that is common across the plurality of queues being maintained for each of the multiple threads; and locking the cacheable region of memory associated with a queue in the plurality of queues prior to one of the multiple threads performing an operation in the second set of one or more operations that accesses the cacheable region of memory.

19. The computer program product of claim 14, wherein storing each operation performed in the second subset of operations comprises:

storing, after each operation in the second set of one or more operations has been performed, the results of the operation from the second set of one or more operations in one of the plurality of queues based on the memory location accessed by the operation and the cacheable region of memory associated with the queue.

20. The computer program product of claim 19, further comprising:

performing, for at least one queue in the plurality of queues comprising results of operations in the second set of one or more operations, a third subset of the plurality of operations from a third partition of the program, the third subset of operations utilizing results of the operations in the second set of one or more operations stored in the queue as input.

* * * * *